United States Patent [19]
Lieber et al.

[11] Patent Number: 6,115,814
[45] Date of Patent: Sep. 5, 2000

[54] MEMORY PAGING SCHEME FOR 8051 CLASS MICROCONTROLLERS

[75] Inventors: Timothy Lieber, Colorado Springs; Timothy J. Morris, Fleming, both of Colo.

[73] Assignee: Compaq Computer Corporation, Houston, Tex.

[21] Appl. No.: 08/971,056

[22] Filed: Nov. 14, 1997

[51] Int. Cl.[7] ................................................ G06F 13/14
[52] U.S. Cl. ........................... 713/2; 710/130; 710/261; 710/262
[58] Field of Search ................................ 713/1, 2, 100; 710/49, 130, 261, 262

[56] References Cited

U.S. PATENT DOCUMENTS

| | | | |
|---|---|---|---|
| 5,381,540 | 1/1995 | Adams et al. | 395/425 |
| 5,446,864 | 8/1995 | Burghardt et al. | 395/427 |
| 5,454,114 | 9/1995 | Yach et al. | 395/750 |
| 5,455,937 | 10/1995 | Berman et al. | 395/500 |
| 5,504,903 | 4/1996 | Chen et al. | 395/700 |
| 5,825,854 | 10/1998 | Larson et al. | 379/67 |
| 5,890,003 | 3/1999 | Cutts, Jr. et al. | 395/736 |
| 5,914,543 | 6/1999 | Scherpenberg et al. | 307/126 |

Primary Examiner—Joseph E. Palys
Assistant Examiner—Omar A. Omar
Attorney, Agent, or Firm—Christine M. Kuta; William J. Kubida; Hogan & Hartson LLP

[57] ABSTRACT

A field-reprogammable storage control device has a microcontroller, a write-protected memory which contains a boot code for the storage control device, a rewriteable memory for application code executable by the microcontroller, and a jump function located in both the write-protected memory and the rewriteable memory for movement between the write-protected memory and the rewriteable memory for recover after a processing interruption. The storage control device remains operational using the write-protected memory and the boot code while receiving a new application code from a remote site.

9 Claims, 5 Drawing Sheets

| COMMAND | ADDRESS |
|---|---|
| NOP | $0_X 0080$ |
| NOP | $0_X 0081$ |
| ⋮ | ⋮ |
| NOP | $0_X 009D$ |
| JUMP RESET | $0_X 00A0$ |

*FIG. 2*

MEMORY PAGING SCHEME FOR 8051 CLASS MICROCONTROLLERS

FIELD OF THE INVENTION

This invention relates generally to computer systems, and more particularly to microcontroller memories.

BACKGROUND OF THE INVENTION

Microcontrollers control a wide variety of devices. For example, in a computer storage system having multiple disk drives and multiple power supplies, an Environmental Monitoring Unit (EMU) is controlled by a microcontroller. The EMU performs a variety of tasks including monitoring power supply voltage and currents, fan speeds, temperature of the storage system enclosure, and the status of the various disk drives in the storage system. The EMU reports to a host system, and may perform low level control functions such as turning up fan speed to enhance cooling.

Typically, the microcontroller in the EMU may be a member of the Intel 8051 family of microcontrollers. The 8051 microcontroller has two memory regions which are 64 Kbytes of program space and 64 Kbytes of data space. The two memory regions are separately addressable. The program space, also known as code space, is not writeable and may only be accessed by instruction fetches. The data space is read/writeable but programs may not be executed from this memory region.

A rewriteable flash memory is associated with the microcontroller. The flash memory is used to store application code. To program the flash memory, the microcontroller needs data addressable read/write/erase access to the flash memory, i.e. the flash memory needs to be mapped into the data space of the microcontroller. This makes the flash memory inaccessible for program execution. To execute programs from the flash memory, the microcontroller needs program addressable read access to the flash memory, i.e. the flash memory must be mapped into the program space of the microcontroller. This makes the flash memory unwriteable during programming. In addition, the whole of the flash memory becomes inaccessible for reading or writing when any part of it is being erased or programmed.

From time to time, new application code is needed in order to upgrade the storage system or to adapt the system to changing requirements, or to replace application code which has become corrupt. A method of reprogramming, particularly in the case of EPROMs, involves removing the microcontroller having the old application code and replacing it with another having new code. It is preferable to have a method of receiving code into the microcontroller without removing the microcontroller from the storage system. Ideally, continuous operation of the storage system would be maintained while new application code is programmed into the storage system. The limitations of the flash memory, however, prevent continuous operation of the storage system because it is not possible to simultaneously read from and write into the flash memory.

In the process of reprogramming, there is a risk of replacing the current application code with "bad" code. This may occur when corrupt code is received or when the reprogramming process is interrupted for some reason, such as a power outage, and the resulting code is incomplete. In systems where the boot code is part of the application code or where the boot code is stored in the same memory as the application code, bad code results in significant system down time while the system is reprogrammed with new boot code.

It is desirable to integrate a programmable memory into an arrangement having a microcontroller having a write-protected memory, such as an 8051 chip, so that application code may be received while a basic code, i.e. a boot code, is retained from which the system may continue to operate.

SUMMARY OF THE INVENTION

The problems of integrating programmable memory with a microcontroller architecture such as the 8051 architecture are solved by the present invention of a system having a write-protected memory having a system boot code, a rewriteable memory for application code and a jump function in each memory for moving between the memories. During reprogramming of the rewriteable memory, or while the application is otherwise not available, the system maintains operation by "jumping" to the boot code in the write-protected memory. The boot code contains all the functional code necessary to operate the controller until the application is again available.

At start-up and after a hard or soft reset of a control device, a microcontroller in the control device executes the boot code out of the write-protected memory. The microcontroller, using the jump function, switches to the rewriteable memory containing application code after the microcontroller has determined that the flash application code is valid. The jump function is located at the same physical address in both the write-protected memory and the rewriteable memory. While receiving new application firmware, the microcontroller switches back to the write-protected memory and the control device continues to operate while the new application firmware is written into the rewriteable memory. If the writing of new application firmware to the rewriteable memory is interrupted, or if the application firmware is invalid, the control device can continue operation because it has valid code in the write-protected memory. The movement between the memories is transparent to the system being controlled by the control device. Therefore, it is not necessary to overlap functions in the write-protected memory and the rewriteable memory, other than the jump function, because the controller can move back and forth between the write-protected memory and the rewriteable memory as needed. The memory components of the control device are synchronized so that the control device starts safely from a memory containing good code. In addition, the memory size of the control device is effectively extended with the addition of a rewriteable memory.

BRIEF DESCRIPTION OF THE DRAWINGS

The present invention together with the above and other advantages may best be understood from the following detailed description of the embodiments of the invention illustrated in the drawings, wherein:

FIG. 2 is an implementation of command code for the jump function of FIG. 1;

DETAILED DESCRIPTION

Figure 1:
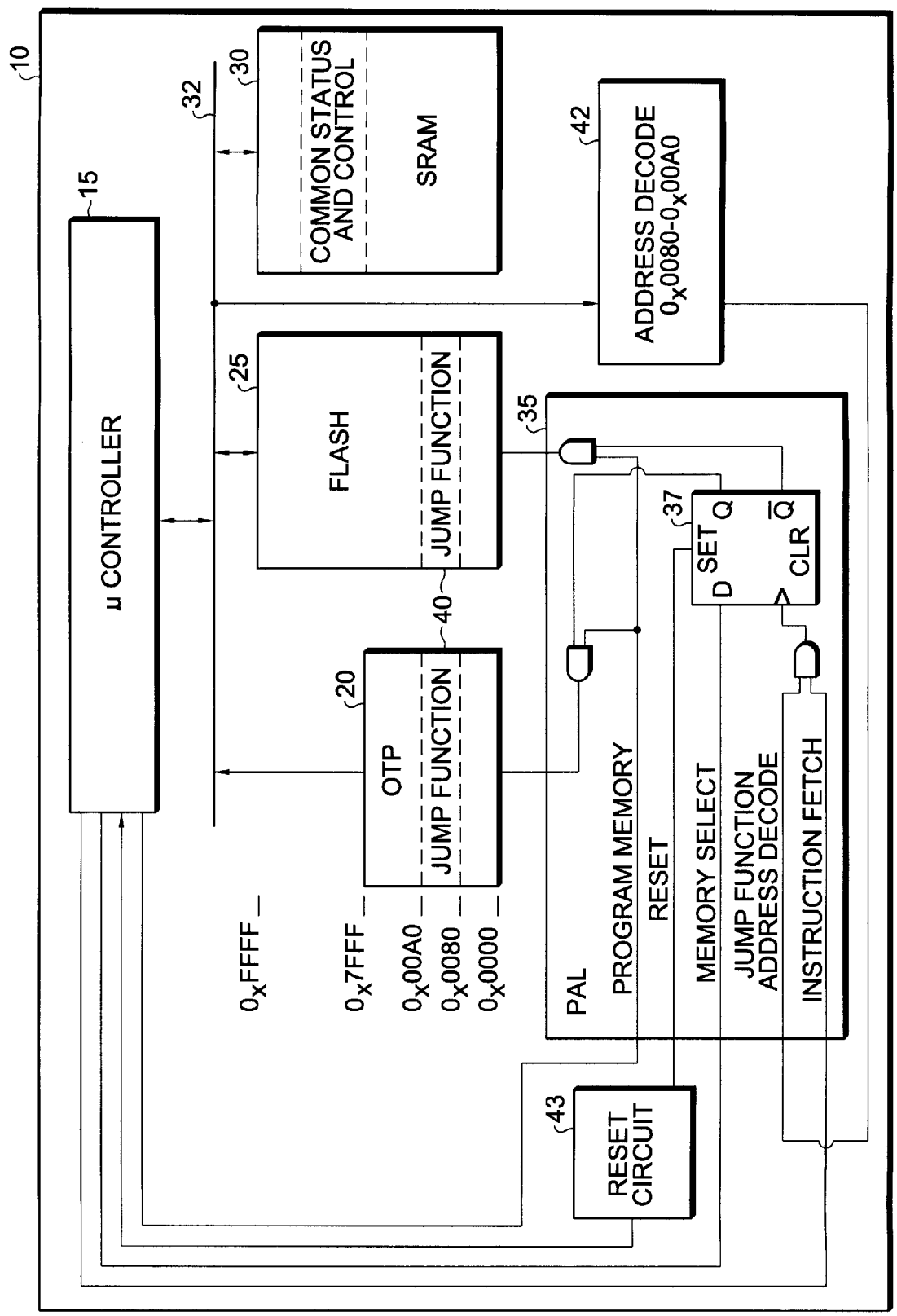
FIG. 1 is a diagram of a microcontroller provided with a jump function according to the principles of the present invention including a memory map.

FIG. 1 is a diagram of an Environmental Monitoring Unit (EMU) controller 10 including a memory map illustrating principles of the present invention.

The controller 10 has a microcontroller 15, a write-protected memory 20, a flash memory 25, and a static random access memory (SRAM) 30, which are all connected together by a bus 32. A registered programmed array logic (PAL) 35 having a D-type flip-flop (D-flop) 37 interfaces with the write-protected memory 20 and the flash memory 25. Both the write-protected memory 20 and the flash memory 25 have a jump function 40 which will be described below. The controller 10 also has an address decode circuit 42 and a reset circuit 43 both coupled to the microcontroller 15 and the PAL 35.

In the present embodiment of the invention, the microcontroller is an 8051 chip. The 8051 chip has a Harvard architecture, i.e. it has separate program and data spaces. In the 8051 architecture, the write-protected memory is a one-time programmable memory meaning that it may be programmed once and is not reprogrammable. The principles of the present invention may be applied to other chips having the Harvard architecture such as the 8052 microprocessor and the 8031 microprocessor.

The write-protected memory 20 is programmed once, generally at the site where it is manufactured, and thereafter not reprogrammed. In the present embodiment of the invention, the write-protected memory 20 is, for example, a 32 Kbyte memory. The write-protected memory 20 could be any non-volatile memory which is physically separate from the flash memory 25. The write-protected memory 20 could for example be an EPROM or any mass program part.

The flash memory 25 is a rewriteable memory for storing applications. In the present embodiment of the invention, the flash memory 25 is, for example, a 64 Kbyte memory. The flash memory 25 can be any non-volatile part which is electrically reprogrammable such as an EEPROM, a CMOS RAM with a battery, or any other flash part. The SRAM 30 is used as buffer space.

The write-protected memory 20 contains all the functional code necessary to operate the controller 10. That is, the write-protected memory 20 acts as a boot ROM and contains the necessary firmware to initialize the EMU and to download application code to the flash memory 25. The flash memory 25 contains the application firmware. The PAL 35 controls the memory map. The D-flop 37 is clocked by an Instruction Fetch signal from the microcontroller 15. The Instruction Fetch signal is combined with a jump function address decode from the microcontroller 15 which is transmitted via the address decode circuit 42.

The D-flop 37 latches the state of the memory map select bit which is a port output of the microcontroller 15. The output of the D-flop 37 enables/disables the Chip Selects of the write-protected memory 20 or the flash memory 25 depending on which memory map is being selected.

The jump function 40 is a function common to both the write-protected memory 20 and the flash memory 25. The jump function 40 is preferably located at the same physical address in both the write-protected memory 20 and the flash memory 25. The jump function 40 is programmed into the write-protected memory 20 along with the system boot code. The jump function 40 in the flash memory 25 is downloaded with the application firmware. In the present embodiment of the invention, the jump function 40 is located for example at address 0x0080. The last instruction in both memories 20, 25 is a command that causes the microcontroller 15 to jump to reset. The reset command restarts the computer system at the boot code. The jump function 40 in the write-protected memory 20 results in a redirection of the microcontroller 15 to the flash memory 25. The jump function 40 in the flash memory 25 directs the microcontroller 15 to go to the write-protected memory 20 to initialize the system.

At start-up and after a hard or soft reset of the system 10, the microcontroller 15 executes the permanent boot code which is stored in the write-protected memory 20. The microcontroller 15 switches to the flash memory 25 containing the application code after the microcontroller 15 has determined that the flash image is valid. During download of any new application firmware, the microcontroller 15 switches back to the write-protected memory 20 and the system 10 continues to operate while the new application firmware is downloaded into the flash memory 25. If the download is interrupted, or if the application firmware is invalid, the system 10 can continue operation because it always has valid code in the write-protected memory 20. The movement between the memories is transparent to the computer system being controlled by the controller. The memory components (write-protected memory 20, flash 25, and SRAM 30) are synchronized, as will be disclosed below, to assure safe starts.

In addition, the memory size is effectively extended with the addition of a reprogrammable flash memory. In the present embodiment of the invention, the memory is extended from, for example, 64 Kbytes to 96 Kbytes. It is possible to extend the memory even further. Also, it is not necessary to overlap functions, other than the jump function, in the write-protected memory and the flash memory because the controller can move back and forth between the write-protected memory and the flash memory as needed.

FIG. 2 shows the code of the jump function 40 contained in both the write-protected memory 20 and the flash memory 25. In the present embodiment of the invention, the jump code is, for example, 32 bytes in length. In the present embodiment of the invention, the jump function 40 has several bytes of No Operation (NOP) instructions followed by a jump to reset. The jump function 40 could be as few as 4 bytes: one NOP instruction and a jump command. The jump function 40 is called whenever a memory re-mapping is required, e.g. at system initialization or for downloading new application firmware. The NOP instructions are used as safety instructions and allow the microcontroller 15 to fetch instructions that will not affect the Processor Status Word (PSW) while the memory pages are being changed. The PSW is a byte inside the microcontroller 15 which holds the internal status of the microcontroller 15.

Figure 3A:
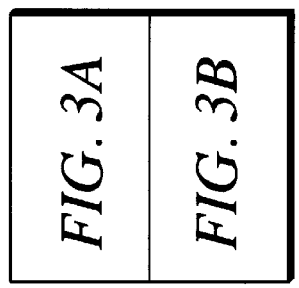
FIG. 3 is a flow chart by which the process of the microcontroller of FIG. 1 operates out of a write-protected memory; and, FIG. 4 is a flow chart of the process by which the microcontroller of FIG. 1 operates out of flash memory.
Figure 3A:
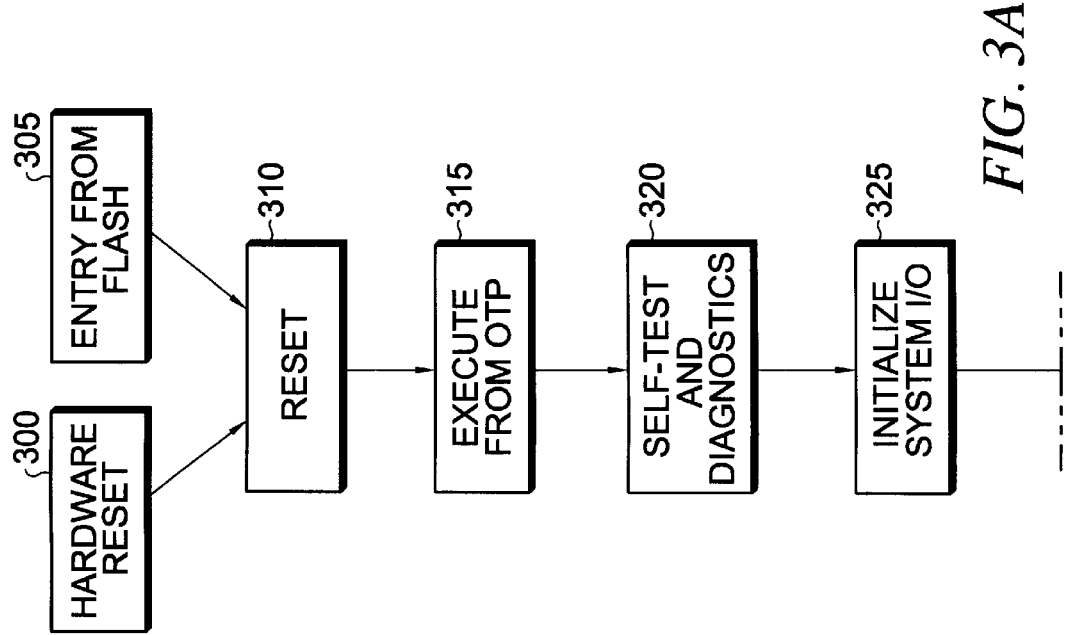
Figure 3B:
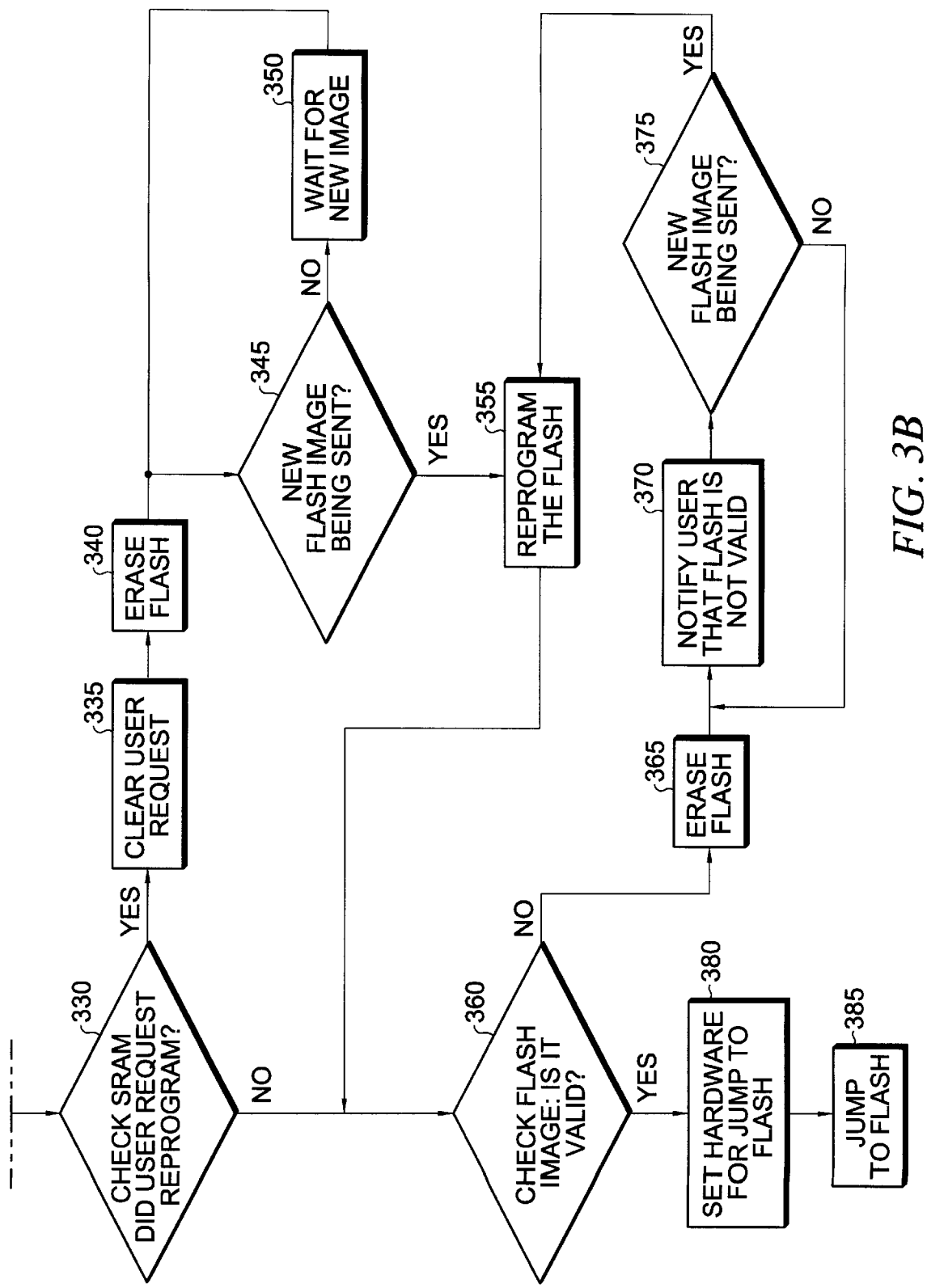

FIG. 3 is a flow chart of the process by which the controller 10 operates out of the write-protected memory 20. On power up of the system, block 300, or upon switching from the flash memory 25, block 305, a reset pulse from the microcontroller 15 sets the D-flop 37 to the write-protected memory 20, block 310. Upon receiving the reset pulse, the microcontroller 15 begins executing code out of the write-protected memory 20, block 315. The reset pulse sets the D-flop 37 back to the write-protected memory 20, also known as the boot memory, which contains all the functional code necessary to operate the controller 10.

After beginning execution out of the write-protected memory 20, the microcontroller 15 performs a self-test and diagnostics, block 320, and then initializes system I/O, block 325. The microcontroller 15 then checks the SRAM 30 for a user request to reprogram from a human user of the controller, block 330. If a user request to reprogram is found, the microcontroller 15 clears the user request, block 335, and then erases the flash memory 25, block 340. The microcontroller 15 then determines if a new flash image is being sent as a result of the user request, block 345. If no new flash image is being sent, the microcontroller 15 waits for a new flash image, block 350. If a new flash image is being sent, the microcontroller 15 loads the new image into the flash memory 25, block 355, i.e. the flash memory 25 is reprogrammed.

After the flash memory 25 is reprogrammed, the microcontroller 15 checks the flash memory 25 to determine whether the flash image is valid, block 360. To do this, the microcontroller 15 uses a checksum test.

If the microcontroller 15 determines that the flash image is invalid (due to a bad checksum), the microcontroller 15 erases the flash memory 25, block 365, and then notifies the user that the flash image is not valid, block 370. The microcontroller 15 then determines whether a new flash image is being sent, block 375. If no new flash image is being sent, the microcontroller 15 returns to notifying the user that the flash image is invalid. If a new flash image is being sent, the microcontroller 15 reprograms the flash memory 25, block 355, and validates the new flash image, block 360.

If the microcontroller 15 determines that the flash image is valid, block 360, the microcontroller 15 sets the hardware for a jump to the flash memory 25, block 380, by setting a memory toggle. Then, the microcontroller 15 jumps to the jump function 40 which directs the microcontroller 15 to the flash memory 25, block 385. When the microcontroller 15 jumps to the address of the jump function 40 in the write-protected memory 20, the D-flop 37 is clocked and switches to the flash memory 25.

Figure 4:
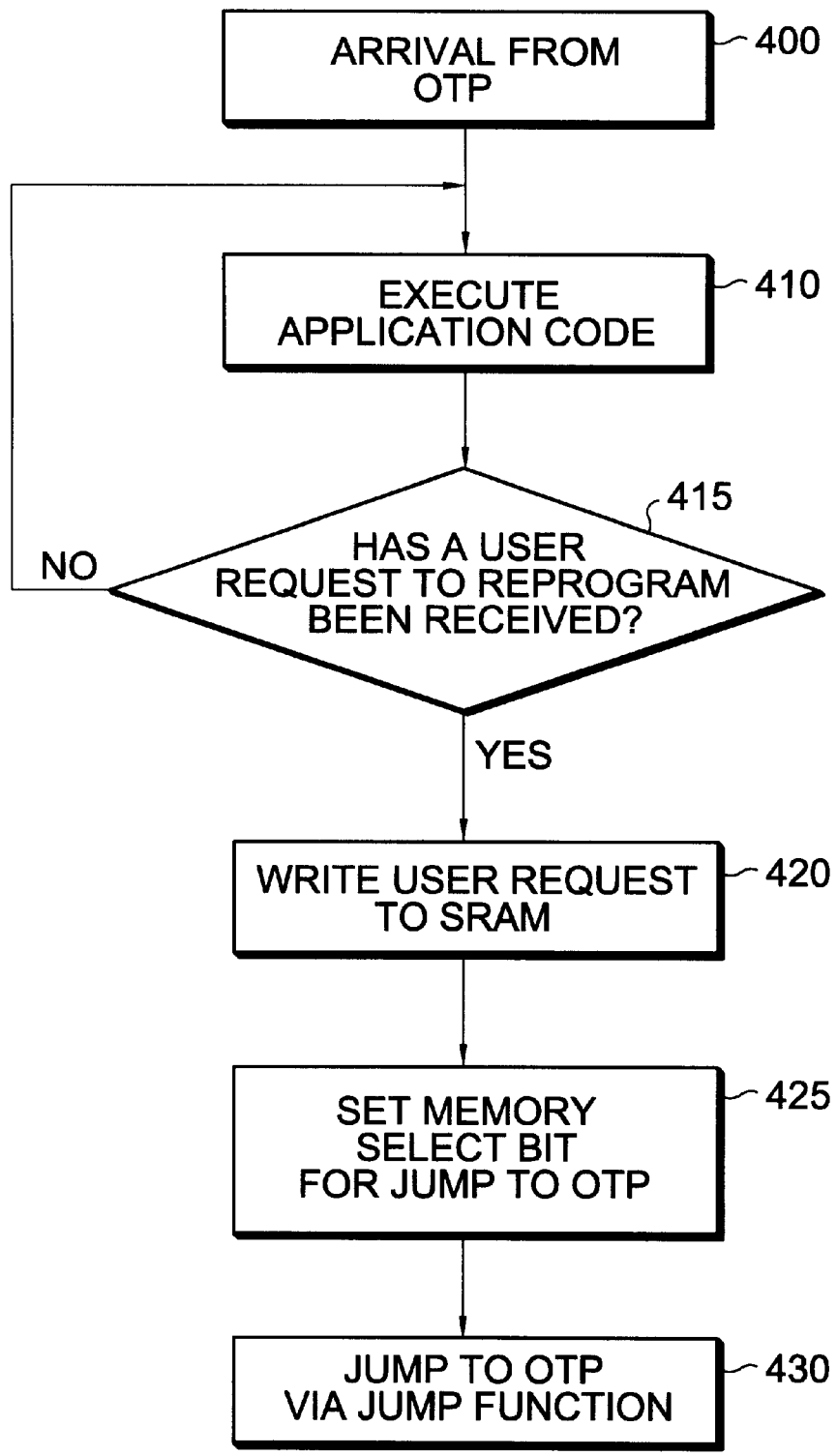

FIG. 4 is a flow chart of the process by which the controller operates out of flash memory 25. After switching over from the write-protected memory 20, block 400, the microcontroller 15 begins executing the application code programmed into the flash memory 25, block 410. The microcontroller 15 then determines whether a user request to reprogram has been received, block 415. If no user request has been received, the microcontroller 15 continues executing the application code already in the flash memory 25, block 410. If a user request to reprogram has been received, the microcontroller 15 writes the user request to the SRAM 30, block 420. The microcontroller 15 then sets the memory select bit in the D-flop 37 for a jump to the write-protected memory 20, block 425. The microcontroller 15 then jumps to the write-protected memory 20 via the jump function 40, block 430.

In addition to being applicable to chips having the Harvard architecture other than the 8051 microcontroller, the principles of the invention are not limited to systems where the signals are decoded by the microcontroller. Other circuits may generate the signals which control the operation of the controller.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A computer system comprising:

a microcontroller;

a write-protected memory coupled to said microcontroller, said write-protected memory having executable boot code for the computer system;

a rewriteable memory coupled to said microcontroller, said rewriteable memory receiving and storing application code for the computer system;

a jump function in said write-protected memory and in said rewriteable memory, said jump function for movement between said write protected memory and said rewritable memory; and, a switch coupled to said microcontroller, said switch operable in response to said jump function to switch operation of said microcontroller between said write-protected memory and said rewriteable memory, wherein said computer system has good boot code in said write-protected memory, and said boot code is executable while the application code is unavailable in said rewriteable memory.

2. The computer system of claim 1 wherein said microcontroller comprises a "Harvard" architecture chip.

3. The computer system of claim 2 wherein said chip is an 8051 chip.

4. The computer system of claim 2 wherein said chip is an 8052 chip.

5. The computer system of claim 2 wherein said chip is an 8031 chip.

6. The computer system of claim 1 wherein said write-protected memory is an EPROM.

7. The computer system of claim 1 wherein said rewriteable memory is an EEPROM.

8. The computer system of claim 1 wherein the said jump function further comprises a NOP command and a jump to reset command.

9. In a system having a write-protected memory, a reprogrammable memory and an SRAM coupled to a microcontroller, the write-protected memory containing a system boot code, a method for reprogramming the reprogrammable memory, comprising the steps of:

executing the boot code from the write-protected memory;

checking the reprogrammable memory for a valid application program;

if the application program is not valid, waiting for new application code; and, if the application program is valid, switching from the write-protected memory to the reprogrammable memory by executing a jump function from the write-protected memory.

* * * * *